United States Patent
McGinn et al.

(10) Patent No.: US 8,402,630 B2
(45) Date of Patent: Mar. 26, 2013

(54) BARRIER FENCE

(75) Inventors: John H. McGinn, Sacramento, CA (US); Vincent P. Morris, Alameda, CA (US)

(73) Assignee: Ertec Environmental Systems, Alameda, CA (US)

( * ) Notice: Subject to any disclaimer, the term of this patent is extended or adjusted under 35 U.S.C. 154(b) by 472 days.

(21) Appl. No.: 12/653,161

(22) Filed: Dec. 9, 2009

(65) Prior Publication Data

US 2010/0199480 A1  Aug. 12, 2010

Related U.S. Application Data

(60) Provisional application No. 61/201,269, filed on Dec. 9, 2008.

(51) Int. Cl.
*B23P 11/00* (2006.01)
*B32B 3/02* (2006.01)

(52) U.S. Cl. ..................... 29/525.01; 428/107

(58) Field of Classification Search ............... 29/525.01, 29/428; 428/107; 256/1, 23, 45; 43/10, 43/7, 60, 64, 65, 58, 124
See application file for complete search history.

(56) References Cited

U.S. PATENT DOCUMENTS

| | | | | |
|---|---|---|---|---|
| 3,112,262 A | 11/1963 | Parkinson | ...................... | 210/130 |
| 3,455,112 A | 7/1969 | Twele | ................................. | 61/3 |
| 4,301,996 A * | 11/1981 | Holyoak | .......................... | 256/1 |
| 4,721,408 A | 1/1988 | Hewlett | ........................... | 405/48 |
| 4,854,773 A | 8/1989 | Nicoll | ............................. | 405/15 |
| 5,108,224 A | 4/1992 | Cabaniss et al. | ................ | 405/52 |
| 5,257,878 A | 11/1993 | Peterson | ......................... | 405/15 |
| 5,338,131 A | 8/1994 | Bestmann | ....................... | 405/24 |
| 5,575,584 A | 11/1996 | Alsop | ............................. | 405/24 |
| 5,632,888 A | 5/1997 | Chinn et al. | .................. | 210/163 |
| 5,733,825 A | 3/1998 | Martin et al. | ................. | 428/372 |
| 5,954,451 A | 9/1999 | Presby | ............................ | 405/49 |
| 5,954,952 A | 9/1999 | Strawser | ....................... | 210/164 |
| 6,017,166 A | 1/2000 | Mossburg | .......................... | 404/5 |
| 6,109,835 A | 8/2000 | Grabhorn | ....................... | 405/302.6 |
| 6,214,216 B1 | 4/2001 | Isaacson | .......................... | 404/4 |
| 6,277,473 B1 | 8/2001 | McGinn | ........................ | 428/188 |
| 6,332,737 B1 | 12/2001 | Mattson | .......................... | 405/63 |
| 6,422,787 B1 | 7/2002 | Mikell | ............................ | 405/15 |
| 6,497,532 B1 | 12/2002 | McGinn | ......................... | 405/27 |
| 6,505,996 B1 | 1/2003 | Ianello et al. | .................. | 405/36 |
| 6,547,493 B2 | 4/2003 | Spangler et al. | ........... | 405/302.6 |
| 6,551,505 B2 | 4/2003 | Chinn et al. | .................. | 210/164 |
| 6,641,335 B1 | 11/2003 | Allard | ........................ | 405/302.6 |
| 6,709,579 B1 | 3/2004 | Singleton et al. | ................ | 404/4 |
| 6,733,209 B2 | 5/2004 | Allard | ........................ | 405/302.6 |
| 6,811,708 B2 | 11/2004 | Shaw et al. | .................... | 210/747 |

(Continued)

FOREIGN PATENT DOCUMENTS

| | | |
|---|---|---|
| GB | 2171131 | 8/1986 |
| JP | 02117326 | * 5/1990 |

*Primary Examiner* — John C Hong
(74) *Attorney, Agent, or Firm* — T. H. P. Richardson (57) ABSTRACT

The movement of small vertebrates, e.g. endangered or threatened species, into and/or out of defined areas, e.g. construction sites, is controlled by use of a barrier fence which includes an apertured polymeric sheet. The polymeric sheet includes an upper portion which extends upwards from the ground and a lower portion which is buried in the ground. The polymeric sheet is formed by first and second sets of polymeric strands which are bonded to each other and are spaced apart from each other, thus providing apertures. The height and depth of the barrier fence and the size of the apertures prevent the small vertebrates from crossing the fence, and the apertures permit wind and water flow through the barrier fence.

24 Claims, 2 Drawing Sheets

U.S. PATENT DOCUMENTS

| | | | |
|---|---|---|---|
| 6,848,866 B1 | 2/2005 | McGinn | 405/302.6 |
| 6,905,289 B1 | 6/2005 | Sanguinetti | 405/302.6 |
| 6,929,425 B1 | 8/2005 | Kimberlin et al. | 405/302.4 |
| 6,974,540 B1 | 12/2005 | Fleischman | 404/4 |
| 7,008,144 B2 | 3/2006 | McGinn | 105/302.6 |
| 7,131,787 B2 | 11/2006 | McGinn | 405/36 |
| 7,172,372 B2 | 2/2007 | McGinn | 405/302.6 |
| 2002/0020658 A1 | 2/2002 | Isaacson | 404/4 |
| 2003/0095833 A1 | 5/2003 | Janz | 403/410 |
| 2003/0143026 A1 | 7/2003 | Santha | 405/15 |

\* cited by examiner

BARRIER FENCE

CROSS-REFERENCE TO RELATED APPLICATIONS

This application claims priority from and the benefit of Provisional Application No. 61/201,269, filed Dec. 9, 2008. This application is related to U.S. Pat. Nos. 6,848,866, 7,008,144 7,131,787 and 7,172,372; U.S. application Ser. No. 11/333,825, filed Jan. 17, 2006 and Ser. No. 11/988,335 filed Jan. 4, 2008; and International Publication Nos. WO 2005/060645 and WO2007/005895. The entire disclosure of each of those Patents, applications and publications is incorporated by reference herein for all purposes.

BACKGROUND OF THE INVENTION

This invention relates to apparatus, systems and methods for controlling the movement of small vertebrates. The apparatus and systems also useful for other is purposes.

SUMMARY OF THE INVENTION

We have discovered, in accordance with the present invention, that the movement of small vertebrates into and/or out of defined areas, e.g. the entry of small vertebrates into construction sites, can be effectively controlled by positioning barrier devices having particular characteristics along part or all of the periphery of such areas. The invention is useful, for example, to prevent the entry of small vertebrates into construction sites, for controlling the movement of vertebrates within fragmented habitat, and the survey perimeter control. The invention is particularly, but not exclusively, useful for controlling the movement of small vertebrates which are endangered or threatened species. In different aspects, this invention provides novel methods and systems for controlling the movement of small vertebrates; novel barrier devices suitable for use in such methods and for other purposes; and novel apertured sheet materials which are useful for incorporation into such barrier devices and for other purposes.

The barrier devices of the invention make use of laminar apertured sheet material which comprises, and preferably consists essentially of, first and second sets of polymeric strands which are bonded to each other at crossover points, leaving apertures between them. The sheet material is supported above the ground along a path which the vertebrates in question are expected to attempt to cross. The size of the apertures and the thickness of the polymeric strands, as well as the height of the barrier, have a significant effect on the ability of the barrier to control the passage of the vertebrates in question (though, in some cases, permitting the passage of other vertebrates), while allowing wind and water to pass through the barrier, so that the barrier is not damaged by wind and water flow. This invention makes use of a laminar apertured sheet material comprising     a first set of polymeric strands (i) which are parallel to each other, and (ii) which are spaced-apart from each other with a distance between adjacent strands of 0.1 to 0.3 inch, and     a second set of polymeric strands (i) which are parallel to each other and at an angle of 30 to 90 degrees to the first strands, (ii) which are bonded to the first strands at crossover points, and (iii) which are spaced-apart from each other with a distance between adjacent strands of 0.1 to 0.3 inch, each of the first and second polymeric strands having a thickness in the laminar dimension of the sheet between the crossover points of 0.04 to 0.5 inch. This laminar sheet material forms part of the present invention, whether it is used in the method of the invention described below or otherwise.

The invention includes the possibility that the apertured sheet material defined above is replaced by an equivalent apertured polymeric sheet material.

In the method of the invention, the apertured sheet material extends upwards from the ground, often but not necessarily substantially vertically, and is maintained in that upright orientation by means of suitable supports, thus forming a barrier device. The supports are preferably such that they do not assist the vertebrates in question to enter the defined area, for example are laterally spaced-apart posts which are secured to the ground on the side of the fence within the defined area. The bottom of the apertured sheet material must be secured to the ground, and in many cases, it is desirable (or necessary, if the vertebrate in question can burrow) for the sheet material to be buried in the ground or secured continuously to an auxiliary member which is buried in the ground. The barrier device itself forms part of the present invention.

BRIEF DESCRIPTION OF THE DRAWINGS

The invention is illustrated in the accompanying drawings, which are diagrammatic sketches and are not to scale, and in which.

DETAILED DESCRIPTION OF THE INVENTION

In the Summary of the Invention above, the Detailed Description of the Invention, the Examples, and the claims below, and in the accompanying drawings, reference is made to particular features of the invention, including for example components, ingredients, devices, apparatus, systems, test results and steps. It is to be understood that the disclosure of the invention in this specification includes all possible combinations of such particular features. For example, where a particular feature is disclosed in the context of a particular mode, aspect, embodiment, Figure or claim, that feature can also be used, to the extent possible, in the context of any other particular mode, aspect, embodiment, Figure, or claim, and in the invention generally. The invention disclosed and claimed herein includes embodiments not specifically described herein and can for example make use of features which are not specifically described herein but which provide functions which are the same, equivalent or similar to, features specifically disclosed herein.

The term "barrier device" is used herein to denote an article which can be secured to the ground and which extends upwards from the ground and which optionally extends downwards into the ground. The primary purpose (and some cases the only purpose) of the barrier devices of the invention is to control the movement of small vertebrates. However, in some cases, the barrier device can also serve an additional purpose, for example to control the movement of sediment through the barrier device, as further described below.

The term "comprises" and grammatical equivalents thereof are used herein to mean that other features are optionally present. For example, a device "comprising" (or "which comprises") components A, B and C can contain only components A, B and C, or can contain not only components A, B and C but also one or more other components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. When, in this specification, a range is given as "(a first number) to (a second number)" or "(a first number)-(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

Where reference is made herein to an apertured sheet, all the apertures in any particular sheet will generally be of the same size and shape, and all the polymeric strands will generally be the same size and shape. If they are not, the dimension referred to is the arithmetic average of the different dimensions.

The apertured sheet material optionally has one or more of the following preferred characteristics.

(1) It has a percentage open area ((U.S. Army Corps of Engineers Standard COE 02215-86) of at least 50%, preferably at least 35%, e.g. 35-50%.
(2) When tested by ASTM D4491, it has a flow rate of at least 600, preferably at least 1500, gallons per square foot per minute.
(3) It has a weight of 0.12-0.25, e.g. 0.150-0.180, pounds per square foot.
(4) When it is exposed to ultraviolet radiation, e.g. direct sunlight, for 500 hours, it changes in tensile strength by less than 20%, for example less than 15%, e.g. less than 10%, based on the tensile strength before the test (for example when tested in accordance with ASTM 4355 or ASTM D4595).
(5) When a sample of the sheet 3 foot square is subjected to a test in which the sample is suspended vertically, with an upper edge of the sample continuously supported and the remainder of the sample hanging freely from the upper support, the supported edge being parallel to the first strands, or parallel to the second strands or being along a line which is equally inclined to the first and second strands, and the suspended sample is exposed to a temperature of 160° C. for 12 hours and then to a temperature of 20° C. for 1 hour, has a vertical dimension which changes by less than is 15%, for example less than 10%, e.g. less than 5%, based on the vertical dimension before the test.
(6) When a sample of the sheet 3 foot square is subjected to a test in which the sample is supported on a flat horizontal surface and maintained for one hour at 100° C. and then at 20° C. for two hours, the sample does not change in any horizontal dimension by more than 5%, for example more than 3%, e.g. more than 1.5%, based on that dimension before the test.
(7) The first and second strands are composed of a polymeric material, preferably the same polymeric material, for example a composition comprising polyethylene, e.g. high density polyethylene. The polymeric material is preferably one that can be recycled.
(8) The first and second strands are composed of a material, e.g. a polymeric material, having a coefficient of friction which is less than 0.4, e.g. less than 0.3. This preferred characteristic is significant in making the barrier more difficult for a vertebrate to climb.
(9) The first and second strands are composed of a material, e.g. a polymeric material, having a tear strength at 20° C. of at least 15, e.g. 18-25, Newtons per square millimeter.
(10) The first and second strands are composed of a material, e.g. a polymeric material having a Shore Hardness at 20° C. of at least 80, for example 90-100.
(11) The angle between the first and second strands is 30-90°, for example 45-90°, e.g. 60-80°.
(12) The width of each of the first and second strands between the crossover points in the plane of the sheet (or if the sheet is not planar, in the laminar dimension of the sheet) is 0.055-0.15 inch, for example about 0.1 inch.
(13) The thickness of the sheet at the crossover points at right angles to the plane of the sheet is 0.1-0.20 inch, e.g. about 0.12-0.16 inch.
(14) The distance between the centers of the first strands is 0.18-0.35 inch, e.g. 0.22-0.28 inch, for example 0.25 inch, and the distance between the centers of the second strands is 0.18-0.35 inch, e.g. 0.22-0.28 inch, for example 0.25 inch.
(15) The distance between adjacent edges of the first strands is 0.12-0.2 inch, for example about 0.15 inch, and the distance between adjacent edges of the second strands is 0.12-0.2 inch 0.12 0.02 inch, e.g. about 0.15 inch.
(16) The size and shape of the apertures is such that the force required to pull a sphere of diameter 0.375 inch through the apertures is at least 38 lbs.
(17) The size and shape of the apertures is such that a cylinder of diameter 0.156 inch will pass through the aperture, with the cylinder just touching the sides of the aperture, and a cylinder of diameter 0.188 inch or larger will not pass through the aperture.
(18) The weight of the sheet is 0.16 to 0.19 pounds per square foot.
(19) The sheet has a tensile strength in the machine direction of at least 400 pounds (ASTM 04595) and in ended the transverse direction of at least 325 pounds (ASTM D4595).
(20) The sheet has a CBR puncture strength (ASTM D6241) of at least 230 lbs.
(21) The sheet is composed of a polymer having a Shore Hardness at 68° F. of least 95.

The height of the barrier device above the ground is generally at least 12 inches, for example at least 24 inches or at least 36 inches, and may be greater, for example 48 inches or 60 inches or even more. The height may be chosen to control the movement of some small vertebrates, but not of others. A higher barrier device will also be effective, but will involve unnecessary expense, unless the movement of some other small vertebrates is to be controlled. For example, if movement of the endangered Red Legged Frog, e.g. in Northern California, is to be controlled, a higher barrier device, e.g. at least 30 or at least 40 inches high, will be required.

The section of the barrier device which is above the ground (which may be substantially the whole of the barrier device) can consist of a planar apertured sheet which extends generally vertically from the ground. In some cases, however, for example when movement of a climbing small vertebrate, e.g. a frog, lizard, salamander, or snake, e.g. a giant garter snake, is to be controlled, the section of the barrier device which is above the ground includes a top section which is inclined in the direction from which the animal is expected to approach the barrier device, i.e. away from the defined area. Thus the barrier device can for example comprise a generally vertical lower section, and a generally inclined upper section, e.g. 3-9 inches in length, the height of the lower section being at least 2 times, for example 2-6, e.g. 3-5, times the height of the upper section. The lower section can for example be generally planar, and the upper section can be generally planar, for example inclined at an angle of 15-135°, e.g. 30-90°, to the lower section. Alternatively, the upper section can be regularly or irregularly curved. The upper section can optionally be maintained in the desired orientation by ties which are secured to the lower section. The upper section can be formed by bending a planar apertured sheet about a laterally extending bending line impressed into the sheet during its manufacture.

The barrier device should be secured to the ground so that small vertebrates whose movement is to be controlled cannot pass underneath the barrier device. In many cases, a portion of the barrier device is buried in the ground. The buried portion can for example be an extension of the apertured sheet material above the ground, or it can be a non-apertured or differently apertured sheet material which is secured to the section of the barrier device which is above the ground. If the small vertebrates(s) whose movement is to be controlled is(are) incapable of burrowing, and there are few or no other burrowing animals that could create passages for the small vertebrates whose movement is to be controlled, then the depth of the buried portion of the barrier device may be quite small, e.g. 3-12 inches. However, to control the movement of an animal that can burrow (for example to control movement of the endangered Arroyo Toad of Southern California), the depth of the buried portion is preferably greater, e.g. 12-24 inches.

In many cases, the whole of the section of the barrier device above the ground offers little obstacle to the passage of wind and sediment-free water through the barrier device. When water containing sediment or other material flows towards the barrier device, the apertures in the barrier device will trap material entrained by the water if the material is too large to pass through the apertures in the barrier device. In some cases, the barrier device includes a lower section including apertures which are smaller than in the remainder of the upper section of the barrier device. Such a lower section can prevent passage of some or all of any sediment and other material entrained by water flowing towards the barrier device. Such a lower section can for example be as described in the documents incorporated by reference herein, for example can include a filter material.

When the barrier device has a lower section as described above, the lower section, when tested by ASTM D4491, has a flow rate substantially lower than, e.g. less than 0.5 times, the ASTM D4491 flow rate of the apertured sheet material, for example a flow rate of less than 600 or less than 400 gallons per square foot per minute, but generally at least 200 or at least 300 gallons per square foot per minute.

It is sometimes desirable for the barrier device to include selected items which make it easier for particular species to pass through the barrier in one direction or the other or in both directions. For example, in order to make it possible for snakes to escape from a protected area, the barrier device can include one or more one-way snake funnels, separated from each other by, for example, a distance of 40 to 80 feet, e.g. about 60 feet. To install a snake funnel, a hole is cut in the apertured polymeric sheet just above the ground and a funnel is installed over the hole, with the funnel pointing away from the protected area. The opposite end of the funnel is fitted with a normally closed flap. A snake can then enter the funnel through the hole in the apertured sheet and escape on the other side by pushing the flap into an open position, but a snake cannot enter the protected area.

In one aspect, this invention provides a method of controlling the movement of vertebrates, the method comprising installing an elongate barrier device along a path which the vertebrates are expected to attempt to cross, the barrier device comprising (1) an elongate laminar sheet which comprises
   (a) an elongate lower portion which extends downwards into the ground to a depth of d inch below the surface of the ground, where d is 3 to 24 inch, and
   (b) an elongate upper portion which
      (b1) extends upwards from the ground to a height of h inch above the surface of the ground, where h is 12 to 60 inch, generally 12 to 36 inch, and
      (b2) comprises a laminar apertured sheet material comprising a first set of polymeric strands (i) which are parallel to each other, and (ii) which are spaced-apart from each other with a distance between adjacent strands of 0.1 to 0.3 inch, and a second set of polymeric strands (i) which are parallel to each other and at an angle of 30 to 90° to the first strands, (ii) which are bonded to the first strands at crossover points, and (iii) which are spaced-apart from each other with a distance between adjacent strands of 0.1 to 0.3 inch, each of the first and second polymeric strands having a thickness in the laminar dimension of the sheet between the crossover points of 0.04 to 0.5 inch, and
(2) a plurality of laterally spaced-apart posts which are secured to the ground and to which the upper portion of the elongate laminar sheet is secured.

It is often convenient for the lower portion and the upper portion to be different parts of the same apertured sheet material. In some embodiments, the upper portion is (i) substantially vertical, (ii) substantially planar, and (iii) consists essentially of the laminar sheet material. In some embodiments, the upper portion comprises
   (a) an elongate substantially vertical base section which (i) is substantially vertical, (ii) is substantially planar, and (iii) consists essentially of the laminar sheet material, and
   (b) an elongate laminar lip section which extends from the top of the base section at an angle of 30 to 120 degrees to the base section.

It is often convenient for the base section portion and the lip section to be different parts of the same apertured sheet material.

In a first embodiment (EF 20) of the method of the invention just described, d is 3 to 8 inch, e.g. about 6 inch, h is 12 to 18 inch, e.g. about 14 inch, and there is no lip section, the lower portion and the upper portion preferably being composed of a single sheet of apertured sheet material. This embodiment is designed to be effective for control of the movement of turtles and tortoises, for example, the Western Pond Turtle (*Actinemis marmorata*), Northwestern Pond turtle (*Clemmys marmorata marmorata*), Southwestern Pond turtle (*Clemmys marmorata pallida*) and Desert tortoise (*Gopherus agassizil*); and also to control the movement of salamanders, for example the California Tiger Salamander (*Ambystoma tigrinum califomiense*), Southern torrent salamander (*Rhyacotriton variegates*), California Coast Range newt (*Taricha torosa*), Inyo Mountain slender salamander (*Batrachoseps campi*), yellow-blotched salamander (*Ensatina escholtzii croceater*), large-blotched salamander (*Ensatina escholtzii klaubeen*), Limestone salamander (*Hydromantes brunus*), Mount Lydell salamander (*Hydromantes platycephalus*), Shasta salamander (*Hydromantes shastae*), Owens Valley web-toed salamander (*Hydromantes platycephalus*), Scott Bar salamander (*Plethodon asupak*), and Del Norte salamander (*Plethodon elongatus elongatus*).

In a second embodiment (EF 30) of the method of the invention just described, d is 8 to 16 inch, e.g. about 12 inch, h is 12 to 24 inch, e.g. about 18 inch, and there is no lip section, the lower portion and the upper portion preferably being composed of a single sheet of apertured sheet material. This embodiment is designed to be effective for control of the movement of toads, for example. The Colorado River toad (*Bufo alvarius*), Arroyo toad (*bufo microscaphus califomicus*), Yosemite toad (*bufo canorus*), Coache's spadefoot toad (*Scaphiopus couchh*), and Western spadefoot toad (*Scaphiopus hammondh*).

In a third embodiment (EF 40) of the method of the invention just described, d is 3 to 8 inch, e.g. about 5 inch, h is 30 to 42 inch, e.g. about 35 inch, and there is no lip section, the lower portion and the upper portion preferably being composed of a single sheet of apertured sheet material. This embodiment is designed to be effective for control of the movement of small mammals, for example the San Joaquin Kit Fox (*Vulpes mutica mutica*), Mount Lyell shrew (*Sorex lyelli*), Buena Vista Lake shrew (*Sorex omatus relictus*), Monterey shrew (*Sorex omatus salarus*), Southern California salt marsh shrew (*Sorex omatus salicomicus*), Suisun shrew (*Sorex omatus sinuosus*), Santa Catalina shrew (*Sorex omatus willetti*), salt-marsh wandering shrew (*Sorex vagrans halicoetes*), Monterey vagrant shrew (*Sorex vagrans paludivagus*), Pygmy rabbit (*Brachylagus idahoensis*), Riparian Brush rabbit (*Sylvagus bachmani riparius*), Sierra Nevada Mountain beaver (*Aplodontidae rufa califomica*), Point Arena Mountain beaver (*Aplodontidae rufa nigra*), Point Reyes Mountain beaver (*Aplodontidae rufa phaea*), Island fox (*Urocyon littoralis*), Santa Catalina fox (*Urocyon littoralis catalinae*), San Miguel fox (*Urocyon littoralis littoralis*), Santa Cruz fox (*Urocyon littoralis santacruzae*) and Santa Rosa fox (*Urocyon littoralis santarosae*).

In a fourth embodiment (EF 40L) of the method of the invention just described, d is 3 to 10 inch, e.g. about 5 inch, h is 24 to 36 inch, e.g. about 30 inch, and there is a lip section 3-8 inch, e.g. about 5 inch, long extending at an angle of 30-90°, e.g. 40-60°, to the base section, the lower portion and the upper portion (including the base section and the lip section) preferably being composed of a single sheet of apertured sheet material. This embodiment is designed to be effective for control of the movement of frogs, for example the California red-legged frog (*Rana draytonia*), Foothill yellow legged frog (*Rana boylii*), Sierra Nevada yellow legged frog (*Rana Sierrae*), Sierra Madre yellow legged frog (*Rana muscosa*), Northern leopard frog (*Rana pipiens*), Lowland leopard frog (*Rana yavapapiensis*), Oregon spotted frog (*Rana pretiosa*), Northern naked frog (*Rana aurora*), Cascades frog (*Rana cascadae*), and Western tailed frog (*Ascaphus truei*); also to control the movement of lizards and skinks, for example the Blunt-nosed leopard lizard (*Gambelia sila*), Coast (San Diego) horned lizard (*phrynosoma coronatum blainvilli*), Coast horned lizard (*phrynosoma coronatum*), Flat-tailed horned lizard (*phrynosoma mcallii*), Panamint alligator lizard (*Elgaria Panamintina*), Black legless lizard (*Aniella pulchria nigra*), Silvery legless lizard (*Aniella pulchria pulchria*), Coronado skink (*Plestiodon skiltonianus interparietalis*)

In a fifth embodiment (EF 40LF) of the method of the invention just described, d is 3 to 10 inch, e.g. about 5 inch, h is 24 to 36 inch, e.g. about 30 inch, and there is a lip section 3-8 inch e.g. about 5 inch long extending at an angle of 30-90°, e.g. 40-60°, to the base section, the lower portion and the upper portion (including the base section and the lip section) preferably being composed of a single sheet of apertured sheet material; and the barrier also includes, at intervals of 30-100 feet, e.g. about 60 feet, a plurality of one-way snake funnels as described above. This embodiment is designed to be effective for control of the movement of snakes, for example, the Alameda Whip Snake (*Masticophis lateralis euryxanthus*), San Joaquin Whip Snake (*Masticophis flagellum ruddocki*), Giant Garter Snake (*Thamnophis gigas*), Rosie boa (*Lichanura trivirgata*), Southern boa (*Charina umbratica*), California Rat Snake (*Elephe rosaliae*), San Diego ringneck snake (*Diadophis punctatus similis*), California mountain kingsnake (*lampropeltis zonata*), Santa Cruz Island gopher snake (*Piluophiis catenifer pumilis*), Coast patch-nosed snake (*Salvadora hexalepis virgultea*), Two-striped garter snake (*Thamnophis hammondii*), Santa Catalina garter snake (*Thamnophis hammondii* ssp.), South Coast garter snake (*Thamnophis sirtalis infemalis*) and Northern red-diamond rattlesnake (*Crotalus exsul*).

In a sixth embodiment (EF 60) of the method of the invention just described, d is 16 to 24 inch, e.g. about 20 inch, h is 30 to 40 inch, e.g. about 35 inch, and there is a lip section 3-8 inch e.g. about 5 inch long extending at an angle of 30-90°, e.g. 40-60°, to the base section, the lower portion and the upper portion (including the base section and the lip section) preferably being composed of a single sheet of apertured sheet material.

THE DRAWINGS

Figure 1:
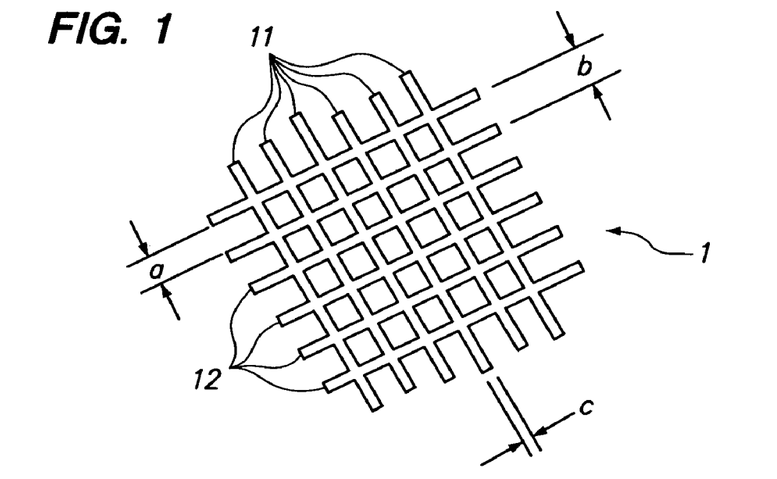
FIG. 1 is a front view of a portion of an exemplary apertured sheet of the present invention.

FIG. 1 is a diagrammatic exemplary sketch of the apertured sheet material 1 of the invention. The sheet material comprises a first set of first polymeric strands 11 and a second set of second polymeric strands 12, which are bonded to the first polymeric strands at crossover points. The dimension a is the distance between adjacent polymeric strands, the dimension b is the center to center between adjacent polymeric strands, and the dimension c is the thickness of the polymeric strands in the laminar dimension of the sheet between the crossover points.

Figure 2:
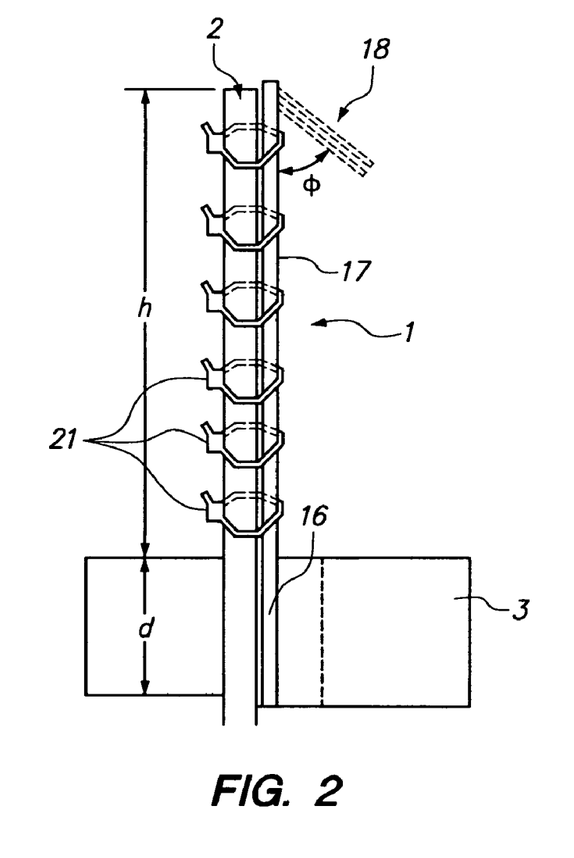
FIG. 2 is a side view at one location of an exemplary installed barrier device of the invention, taken at a post which supports the apertured sheet.

FIG. 2 is a diagrammatic exemplary sketch of a side view at one location of an installed barrier device of the invention, taken at a post which supports the apertured sheet. Apertured sheet material 1 has a lower portion 16 which is buried in and extends downwards into the ground 3 to a distance d, and an upper portion 17 which extends upwards from the ground to a height h. The upper portion is secured by polymeric ties 21 to a vertical post 2. Also shown, in phantom lines, is optional lip portion 18, which extends from the top of the vertical base section 17 at an angle φ to the base section.

Figure 3:
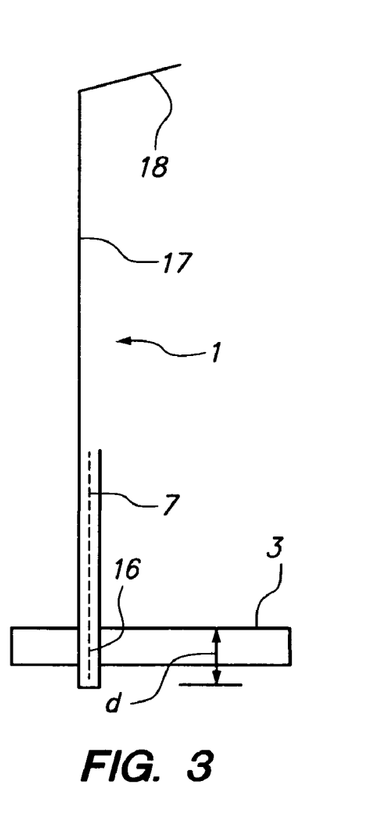
FIG. 3 is a side view at one location of an exemplary installed barrier device of the invention which includes a lower filter section.

FIG. 3 is a diagrammatic exemplary sketch of a side view one location of an installed barrier device of the invention, taken between posts. Apertured sheet material, 1 has a lower portion 16, which is buried in the extends downwards into the ground 3 to a distance d, and an upper portion 17 which includes a lower section, which extends vertically from the ground and an upper lip portion 18. The low part of the barrier devices is composed of two thicknesses of the apertured sheet material, with the filter material 7 sandwiched between them.

Figure 4:
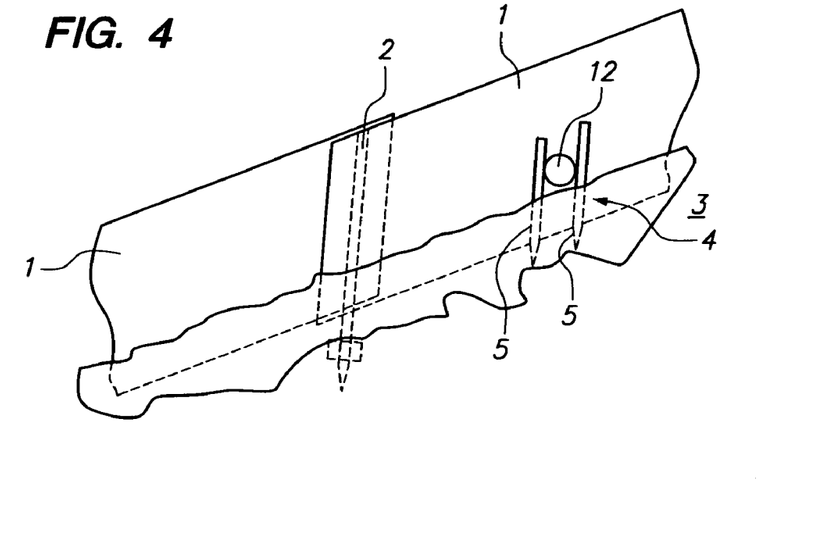
FIG. 4 is a perspective view of an exemplary installed barrier device of the invention.
Figure 5:
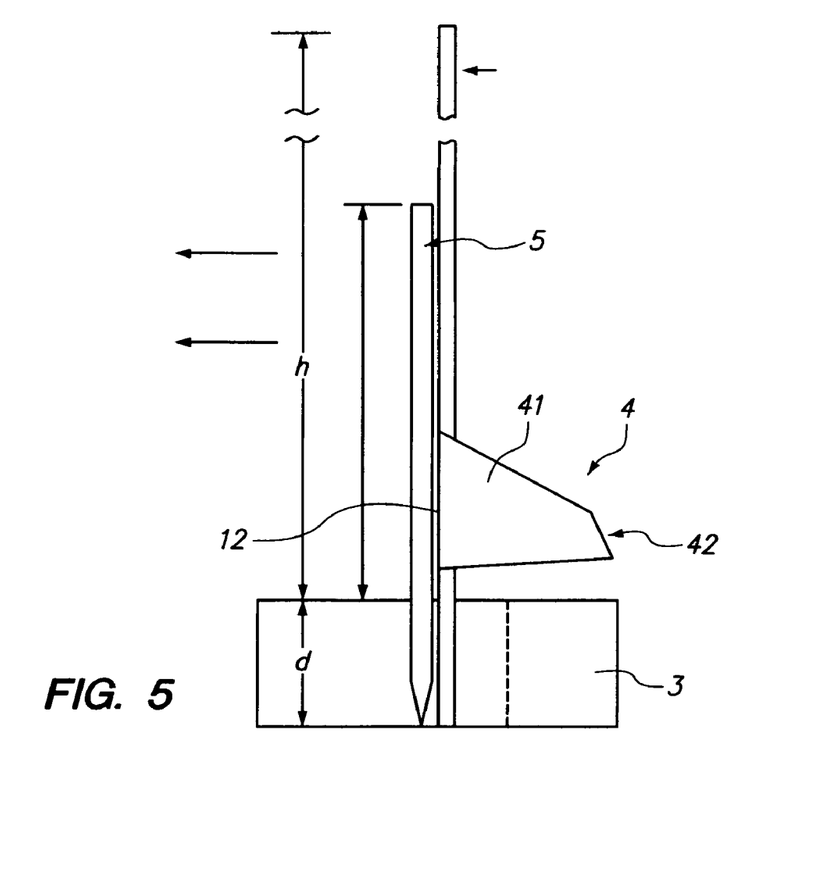
FIG. 5 is a side view at one location of an exemplary installed barrier device of the invention, taken at the location of a one-way snake funnel (as further described below).

FIG. 4 is an exemplary partial perspective view of a section of an installed barrier device of the invention, at a location where two lengths of apertured polymeric sheet 1 overlap and are secured to a post 2. Also shown is one-way snake funnel 4 shown in more detail in FIG. 5. The one-way snake funnel is secured to posts 5 having a height p, which is, for example, 24 inch, and fits over an aperture 12 in one of the apertured polymeric sheets. The snake funnel comprises a funnel portion 41 which terminates in a flap 42, thus allowing a snake to pass through the funnel from left to right in FIG. 5, but preventing a snake from entering the funnel from the right-hand side.

We claim:

1. A method of controlling the movement of vertebrates, the method comprising installing an elongate barrier device along an elongate path which lies along the surface of the ground and which the vertebrates are expected to attempt to cross, the barrier device comprising
   (1) an elongate laminar sheet which comprises
      (a) an elongate lower portion which extends downwards from the elongate path into the ground to a depth of d inch below the surface of the ground, where d is 3 to 24 inch, and
      (b) an elongate laminar upper portion which
         (b1) extends upwards from the elongate, path and away from the ground to a height of h inch above the surface of the ground, where h is 12 to 60 inch, and
         (b2) comprises a laminar apertured sheet material wherein the apertures have a size and shape such that the force required to pull a sphere of diameter 0.375 inches through the sheet is at least 38 lbs, the apertured sheet material having a thickness and a laminar dimension at right angles to the thickness, and the apertured sheet material comprising
            a first set of first polymeric strands which (i) are parallel to each other, and (ii) are spaced-apart from each other with a distance between adjacent strands of 0.1 to 0.3 inch, and
            a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.1 to 0.3 inch,
         each of the first and second polymeric strands having a thickness in the laminar dimension of the sheet between the crossover points of 0.04 to 0.5 inch, and
   (2) a plurality of laterally spaced-apart posts which are secured to the ground and to which the upper portion of the elongate laminar sheet is secured.

2. A method according to claim 1 wherein the lower portion and the upper portion are different parts of the same apertured sheet material.

3. A method according to claim 1 wherein the distance between the adjacent edges of the first strands is 0.12-0.2 inch, and the distance between the adjacent edges of the second strands is 0.12-0.2 inch.

4. A method according to claim 1 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

5. A method according to claim 1 wherein the upper portion is (i) substantially vertical, (ii) substantially planar, and (iii) consists essentially of the laminar sheet material.

6. A method according to claim 1 wherein the upper portion comprises
   (a) an elongate substantially vertical base section which (i) is substantially vertical, (ii) is substantially planar, and (iii) consists essentially of the laminar sheet material, and
   (b) an elongate laminar lip section which extends from the top of the base section at an angle of 30 to 120° to the base section.

7. A method according to claim 6 wherein the base section and the lip section are different parts of the same apertured sheet material.

8. A method according to claim 1 wherein each of the apertures has a size such that a cylinder of diameter 0.156 inch will pass through the aperture just touching the sides of the aperture, and a cylinder of diameter 0.188 inch or larger will not pass through the aperture.

9. A method of controlling the movement of turtles, tortoises and salamanders, the method comprising installing an elongate barrier device along an elongate path which lies along the surface of the ground and which the turtles, tortoises and salamanders are expected to attempt to cross, the barrier device comprising
   (1) an elongate laminar sheet which comprises
      (a) an elongate lower portion which extends downwards from the elongate path into the ground to a depth of d inch below the surface of the ground, where d is 3 to 8 inch, and
      (b) an elongate laminar upper portion which
         (b1) extends upwards from the elongate path and away from the ground to a height of h inch above the surface of the ground, where h is 12 to 18 inch, and
         (b2) comprises a laminar apertured sheet material wherein the apertures have a size and shape such that the force required to pull a sphere of diameter 0.375 inches through the sheet is at least 38 lbs,
      the apertured sheet material having a thickness and a laminar dimension at right angles to the thickness, and
      the apertured sheet material comprising
         a first set of first polymeric strands which (i) are parallel to each other, and (ii) are spaced-apart from each other with a distance between adjacent strands of 0.1 to 0.3 inch, and
         a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.1 to 0.3 inch, each of the first and second polymeric strands having a thickness in the laminar dimension of the sheet between the crossover points of 0.04 to 0.5 inch, and
   (2) a plurality of laterally spaced-apart posts which are secured to the ground and to which the upper portion of the elongate laminar sheet is secured;

wherein the laminar sheet consists essentially of the lower portion and the upper portion, the lower portion is substantially planar, the upper portion is substantially planar, and the lower portion and the upper portion are different parts of the same apertured sheet material.

10. A method according to claim 9 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

11. A method according to claim 9 wherein the laminar sheet has a percentage open area measured by U.S. Army Corps of Engineers Standard COE 02215-86 of 35-50%.

12. A method of controlling the movement of toads, the method comprising installing an elongate barrier device along an elongate path which lies along the surface of the ground and which the toads are expected to attempt to cross, the barrier device comprising
(1) an elongate laminar sheet which comprises
    (a) an elongate lower portion which extends downwards from the elongate path into the ground to a depth of d inch below the surface of the ground, where d is 8 to 16 inch, and
    (b) an elongate laminar upper portion which
        (b1) extends upwards from the elongate path and away from the ground to a height of h inch above the surface of the ground, where h is 12 to 24 inch, and
        (b2) comprises a laminar apertured sheet material wherein the apertures have a size and shape such that the force required to pull a sphere of diameter 0.375 inches through the sheet is at least 38 lbs, the apertured sheet material having a thickness and a laminar dimension at right angles to the thickness, and
        the apertured sheet material comprising
            a first set of first polymeric strands which (i) are parallel to each other, and (ii) are spaced-apart from each other with a distance between adjacent strands of 0.1 to 0.3 inch, and
            a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.1 to 0.3 inch, each of the first and second polymeric strands having a thickness in the laminar dimension of the sheet between the crossover points of 0.04 to 0.5 inch, and
(2) a plurality of laterally spaced-apart posts which are secured to the ground and to which the upper portion of the elongate laminar sheet is secured;
wherein the laminar sheet consists essentially of the lower portion and the upper portion, the lower portion is substantially planar, the upper portion is substantially planar, and the lower portion and the upper portion are different parts of the same apertured sheet material.

13. A method according to claim 12 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

14. A method according to claim 12 wherein the laminar sheet has a percentage open area measured by U.S. Army Corps of Engineers Standard COE 02215-86 of 35-50%.

15. A method of controlling the movement of small mammals, the method comprising installing an elongate barrier device along an elongate path which lies along the surface of the ground and which the small mammals are expected to attempt to cross, the barrier device comprising
(1) an elongate laminar sheet which comprises
    (a) an elongate lower portion which extends downwards from the elongate path into the ground to a depth of d inch below the surface of the ground, where d is 3 to 8 inch, and
    (b) an elongate laminar upper portion which
        (b1) extends upwards from the elongate path and away from the ground to a height of h inch above the surface of the ground, where h is 30 to 42 inch, and
        (b2) comprises a laminar apertured sheet material wherein the apertures have a size and shape such that the force required to pull a sphere of diameter 0.375 inches through the sheet is at least 38 lbs, the apertured sheet material having a thickness and a laminar dimension at right angles to the thickness, and
        the apertured sheet material comprising
            a first set of first polymeric strands which (i) are parallel to each other, and (ii) are spaced-apart from each other with a distance between adjacent strands of 0.1 to 0.3 inch, and
            a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.1 to 0.3 inch, each of the first and second polymeric strands having a thickness in the laminar dimension of the sheet between the crossover points of 0.04 to 0.5 inch, and
(2) a plurality of laterally spaced-apart posts which are secured to the ground and to which the upper portion of the elongate laminar sheet is secured;
wherein the laminar sheet consists essentially of the lower portion and the upper portion, the lower portion is substantially planar, the upper portion comprises (a) a substantially vertical and substantially planar base section and (b) a substantially planar lip section which extends from the top of the base section at an angle of 30 to the 90° to the base section, the lower portion and the upper portion are different parts of the same apertured sheet material, and the lip section is 3-8 inch long.

16. A method according to claim 15 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

17. A method according to claim 15 wherein the laminar sheet has a percentage open area measured by U.S. Army Corps of Engineers Standard COE 02215-86 of 35-50%.

18. A method of controlling the movement of frogs, lizards and skinks, the method comprising installing an elongate barrier device along an elongate path which lies along the surface of the ground and which the frogs, lizards or skinks are expected to attempt to cross, the barrier device comprising
(1) an elongate laminar sheet which comprises (a) an elongate lower portion which extends downwards from the elongate path into the ground to a depth of d inch below the surface of the ground, where d is 3 to 10 inch, and
(b) an elongate laminar upper portion which
(b1) extends upwards from the elongate path and away from the around to a height of h inch above the surface of the ground, where h is 24 to 36 inch, and
(b2) comprises a laminar apertured sheet material wherein the apertures have a size and shape such that the force required to pull a sphere of diameter 0.375 inches through the sheet is at least 38 lbs, the apertured sheet material having a thickness and a laminar dimension at right angles to the thickness, and
the apertured sheet material comprising
a first set of first polymeric strands which (i) are parallel to each other, and (ii) are spaced-apart from each other with a distance between adjacent strands of 0.1 to 0.3 inch, and
a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.1 to 0.3 inch, each of the first and second polymeric strands having a thickness in the laminar dimension of the sheet between the crossover points of 0.04 to 0.5 inch, and
(2) a plurality of laterally spaced-apart posts which are secured to the ground and to which the upper portion of the elongate laminar sheet is secured;
wherein the laminar sheet consists essentially of the lower portion and the upper portion, the lower portion is substantially planar, the upper portion comprises (a) a substantially vertical and substantially planar base section and (b) a substantially planar lip section which extends from the top of the base section an angle of 30 to 90° to the base section, the lower portion and the upper portion are different parts of the same apertured sheet material, and the lip section is 3 to 8 inch long.

19. A method according to claim 18 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

20. A method according to claim 18 wherein the laminar sheet has a percentage open area measured by U.S. Army Corps of Engineers Standard COE 02215-86 of 35-50%.

21. A method of controlling the movement of snakes, the method comprising installing an elongate barrier device along an elongate path which lies along the surface of the ground and which the snakes are expected to attempt to cross, the barrier device comprising (1) an elongate laminar sheet which comprises
(a) an elongate lower portion which extends downwards from the elongate path into the ground to a depth of d inch below the surface of the ground, where d is 3 to 10 inch, and
(b) an elongate laminar upper portion which
(b1) extends upwards from the elongate path and away from the ground to a height of h inch above the surface of the ground, where h is 24 to 46 inch, and
(b2) comprises a laminar apertured sheet material wherein the apertures have a size and shape such that the force required to pull a sphere of diameter 0.375 inches through the sheet is at least 38 lbs,
the apertured sheet material having a thickness and a laminar dimension at right angles to the thickness, and
the apertured sheet material comprising
a first set of first polymeric strands which (i) are parallel to each other, and (ii) are spaced-apart from each other with a distance between adjacent strands of 0.12 to 0.2 inch, and
a second set of second polymeric strands which (i) are parallel to each other and at an angle of 30 to 90 degrees to the first strands, (ii) are bonded to the first strands at crossover points, and (iii) are spaced-apart from each other with a distance between adjacent strands of 0.12 to 0.2 inch,
each of the first and second polymeric strands having a thickness in the laminar dimension of the sheet between the crossover points of 0.04 to 0.5 inch, and
(2) a plurality of laterally spaced-apart posts which are secured to the around and to which the upper portion of the elongate laminar sheet is secured;
wherein the laminar sheet consists essentially of the lower portion and the upper portion, the lower portion is substantially planar, the upper portion comprises (a) a substantially vertical and substantially planar base section and (b) a substantially planar lip section which extends from the top of the base section an angle of 30 to 90° to the base section, the lower portion and the upper portion are different parts of the same apertured sheet material, and the lip section is 3 to 8 inch long.

22. A method according to claim 21 wherein the laminar sheet has a machine direction and a transverse direction, and has a tensile strength in the machine direction of at least 400 lbs measured by ASTM D4595 and a tensile strength in the transverse direction of at least 325 lbs measured by ASTM D4595.

23. A method according to claim 21 wherein the barrier device comprises a plurality of one-way snake funnels laterally spaced apart from each other at intervals of 30-100 feet.

24. A method according to claim 21 wherein the laminar sheet has a percentage open area measured by U.S. Army Corps of Engineers Standard COE 02215-86 of 35-50%.

* * * * *